United States Patent
Ito (10) Patent No.: US 10,187,378 B2
(45) Date of Patent: Jan. 22, 2019

(54) AUTHENTICATION SYSTEM AND NON-TRANSITORY COMPUTER READABLE MEDIUM

(71) Applicant: FUJI XEROX CO., LTD., Tokyo (JP)

(72) Inventor: Kensuke Ito, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 90 days.

(21) Appl. No.: 14/819,304

(22) Filed: Aug. 5, 2015

(65) Prior Publication Data
US 2015/0341337 A1    Nov. 26, 2015

Related U.S. Application Data

(63) Continuation of application No. PCT/JP2013/077404, filed on Oct. 8, 2013.

(30) Foreign Application Priority Data

May 27, 2013  (JP) ................... 2013-110690

(51) Int. Cl.
| | |
|---|---|
| *H04L 29/06* | (2006.01) |
| *G07D 7/2033* | (2016.01) |
| *G07D 7/0047* | (2016.01) |

(52) U.S. Cl.
CPC ......... *H04L 63/083* (2013.01); *G07D 7/0047* (2017.05); *G07D 7/2033* (2013.01)

(58) Field of Classification Search
CPC .................................................. G07D 7/2033
USPC .......................................................... 726/6
See application file for complete search history.

(56) References Cited

U.S. PATENT DOCUMENTS

| | | | | |
|---|---|---|---|---|
| 8,630,481 B2 * | 1/2014 | Kane | .................. | G06K 9/00201 |
| | | | | 382/154 |
| 9,076,021 B2 * | 7/2015 | Pittelko | ............... | G06F 11/1446 |
| 9,177,128 B2 * | 11/2015 | Ninjouji | .................. | G06F 21/31 |
| 2006/0069923 A1 | 3/2006 | Ito et al. | | |

(Continued)

FOREIGN PATENT DOCUMENTS

| | | |
|---|---|---|
| CN | 1755705 A | 4/2006 |
| CN | 1897045 A | 1/2007 |

(Continued)

OTHER PUBLICATIONS

Jul. 12, 2016 Office Action issued in Japanese Patent Application No. 2013-110690.

(Continued)

*Primary Examiner* — Khalil Naghdali
(74) *Attorney, Agent, or Firm* — Oliff PLC (57) ABSTRACT

An authentication server 2 stores, for each of one or more objects to be registered, unique pattern information of a surface of the object to be registered and a personal identification number into a database in association with each other, acquires unique pattern information of a surface of an object to be authenticated which is related to an authentication request, and a personal identification number, extracts, from the database, unique pattern information stored in association with the personal identification number related to the authentication request, and determines whether the extracted unique pattern information includes unique pattern information corresponding to the unique pattern information related to the authentication request.

6 Claims, 11 Drawing Sheets

(56) References Cited

U.S. PATENT DOCUMENTS

| | | |
|---|---|---|
| 2006/0180515 A1 | 8/2006 | Kimura et al. |
| 2006/0212812 A1* | 9/2006 | Simmons .............. G06F 3/04883 715/203 |
| 2007/0098224 A1 | 5/2007 | Morita |
| 2009/0080710 A1 | 3/2009 | Abe et al. |
| 2009/0300733 A1 | 12/2009 | Inomata et al. |
| 2011/0296505 A1* | 12/2011 | Perez ..................... G06F 3/011 726/6 |
| 2013/0069763 A1 | 3/2013 | Abe et al. |
| 2015/0302421 A1* | 10/2015 | Caton .................. G06Q 30/018 705/17 |
| 2015/0347889 A1* | 12/2015 | Nosaka ................... G06K 7/10 726/7 |

FOREIGN PATENT DOCUMENTS

| | | |
|---|---|---|
| CN | 101394409 A | 3/2009 |
| CN | 101594351 A | 12/2009 |
| CN | 102457832 A | 5/2012 |
| CN | 102932542 A | 2/2013 |
| EP | 1 223 560 A2 | 7/2002 |
| EP | 1 293 874 A2 | 3/2003 |
| JP | 2003-067687 A | 3/2003 |
| JP | 2007-140884 A | 6/2007 |
| JP | 2010-141480 A | 6/2010 |
| JP | 4687060 B2 | 5/2011 |
| JP | 2012-185736 A | 9/2012 |
| WO | 00/10125 A1 | 2/2000 |
| WO | 2008/110787 A1 | 9/2008 |

OTHER PUBLICATIONS

Nov. 5, 2013 Search Report issued in International Patent Application No. PCT/JP2013/077404.

Apr. 1, 2017 Office Action issued in Chinese Patent Application No. 201380074794.

Apr. 25, 2017 Extended European Search Report issued in European Application No. 13886101.8.

* cited by examiner

| REGISTRATION ID | UNIQUE PATTERN INFORMATION | PERSONAL IDENTIFICATION NUMBER | DEVICE ID |
|---|---|---|---|
| 0001 | 1010110010 | 1234 | D0001 |
| 0002 | 000101011 | 7890 | D0002 |
| ⋮ | ⋮ | ⋮ | ⋮ |
| 1001 | 100010111 | 1234 | D0003 |
| ⋮ | ⋮ | ⋮ | ⋮ |
| 3001 | 101110001 | 1234 | D0004 |
|  |  |  |  |

| PERSONAL IDENTIFICATION NUMBER | UNIQUE PATTERN INFORMATION | DEVICE ID |
|---|---|---|
| 1234 | 1010110010 | D0001 |
| 1234 | 100010111 | D0002 |
| 1234 | 101110001 | D0003 |

⋮

| PERSONAL IDENTIFICATION NUMBER | UNIQUE PATTERN INFORMATION | DEVICE ID |
|---|---|---|
| 7890 | 000101011 | D0002 |
| 7890 | 100001100 | D0005 |

| REGISTRATION ID | UNIQUE PATTERN INFORMATION | PERSONAL IDENTIFICATION NUMBER | CARD IDENTIFICATION INFORMATION |
|---|---|---|---|
| C0001 | 10010001 | 5555 | 10001 100-1111111 |
| C0002 | 10010011 | 6666 | 10001 100-1112222 |
| ⋮ | ⋮ | ⋮ | ⋮ |
| C1001 | 00101111 | | 10011 101-3333333 |
| ⋮ | ⋮ | ⋮ | ⋮ |
| C2001 | 10010101 | 5555 | 10021 102-4444444 |
| ⋮ | ⋮ | ⋮ | ⋮ |
| C3001 | 10000001 | | 10031 103-5555555 |

AUTHENTICATION SYSTEM AND NON-TRANSITORY COMPUTER READABLE MEDIUM

CROSS REFERENCE TO RELATED APPLICATION

This is a continuation of International Application No. PCT/JP2013/077404 filed on Oct. 8, 2013, and claims priority from Japanese Patent Application No. 2013-110690, filed on May 27, 2013.

BACKGROUND

1. Technical Field

The present invention relates to an authentication system and a program.

2. Related Art

For example, a pattern appearing on the surface of each individual physical object such as paper or a card often represents characteristics unique to each individual physical object. Accordingly, techniques are known which uniquely identify a physical object by using a surface pattern unique to each individual physical object.

SUMMARY

An aspect of the present invention provides an authentication system including a storing unit that stores, for each of one or more objects to be registered, unique pattern information of a surface of the object to be registered, and a personal identification number into a storage unit in association with each other, an acquiring unit that acquires unique pattern information of a surface of an object to be authenticated which is related to an authentication request, and a personal identification number, an extracting unit that extracts, from the storage unit, unique pattern information stored in association with the personal identification number acquired by the acquiring unit, and a determining unit that determines whether the unique pattern information extracted by the extracting unit includes unique pattern information corresponding to the unique pattern information acquired by the acquiring unit.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments (to be referred to as embodiments hereinafter) for carrying out the present invention will be described with reference to the figures.

1. First Embodiment

First, an authentication system S according to a first embodiment of the present invention will be described. The authentication system S according to the first embodiment uses a medium that has a unique pattern on its surface, such as paper or a card, as a key for an electric lock 3 provided to a door D. The medium to be used as a key for the electric lock 3 in this case may be any medium that has a unique pattern on its surface.

Figure 1:
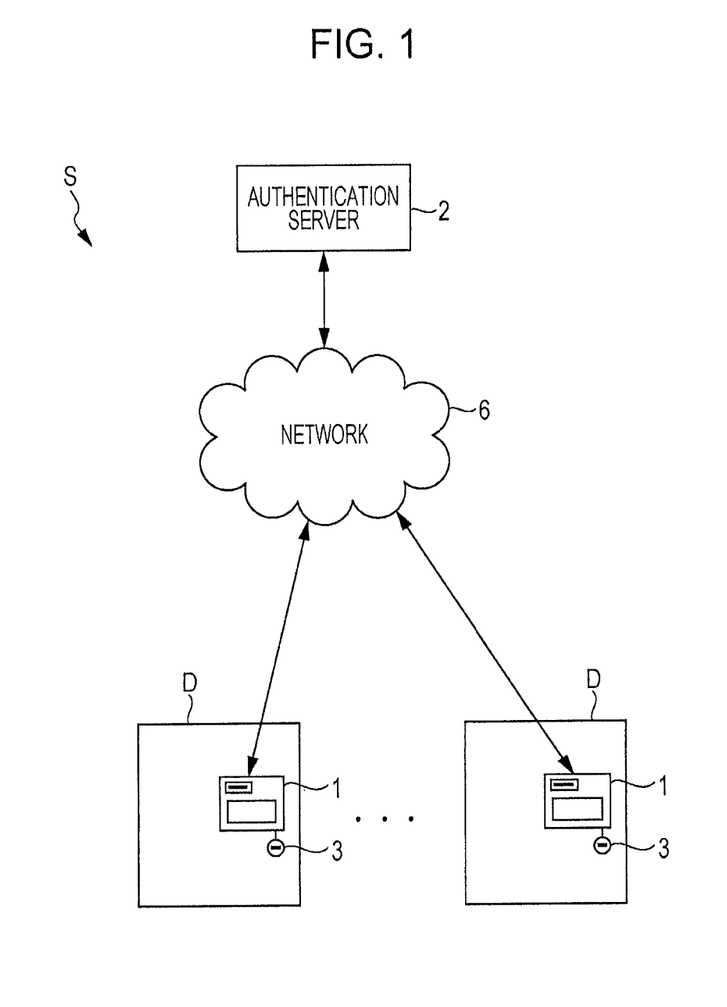
FIG. 1 is a system configuration diagram of an authentication system according to a first embodiment.

FIG. 1 is a system configuration diagram of the authentication system according to the first embodiment. As illustrated in FIG. 1, the authentication system S includes one or more authentication requesting apparatuses 1 that control locking and unlocking of the electric lock 3 provided to each door D, and an authentication server 2. Each of the authentication requesting apparatuses 1 and the authentication server 2 communicate data with each other via a network 6. The network 6 may be either a wide area network or a local area network, or may represent an environment in which both the networks exist.

In the first embodiment, first, a user uses the authentication requesting apparatus 1 to register, with the authentication server 2, unique pattern information of the surface of a medium used as a key for the door D of interest, and a personal identification number. Once the unique pattern information of the medium and the personal identification number are registered, the user may be able to unlock the electric lock 3 by correctly inputting the registered medium and the registered personal identification number to the authentication requesting apparatus 1. An example of functions provided to the authentication system S to execute the above process will be described below.

[1-1. Hardware Configuration]

Figure 2:
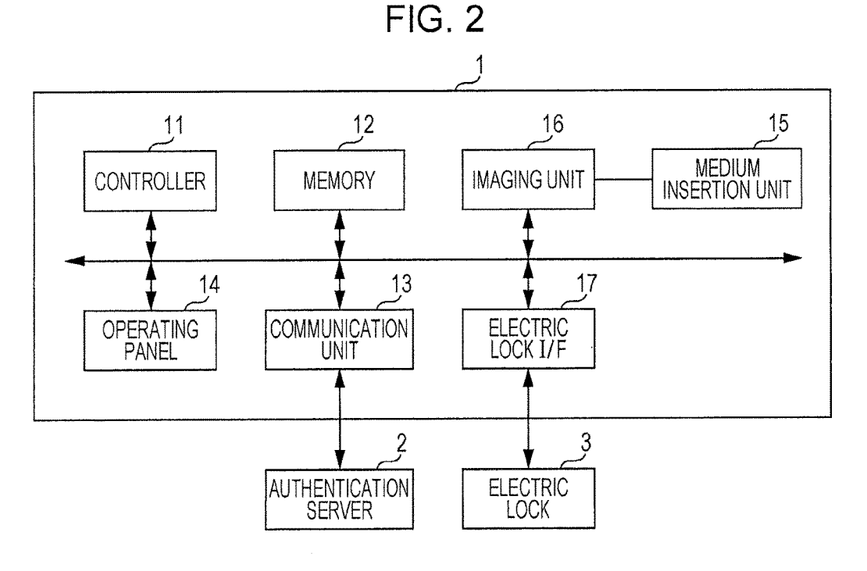
FIG. 2 is a hardware configuration diagram of an authentication requesting apparatus.
Figure 3:
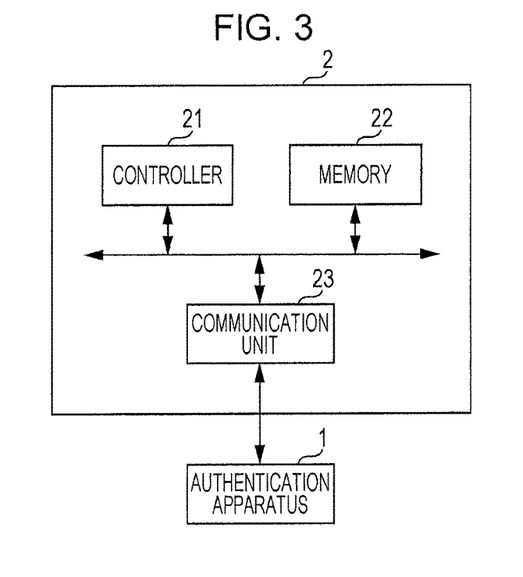
FIG. 3 is a hardware configuration diagram of an authentication server.

FIGS. 2 and 3 illustrate exemplary hardware configurations of the authentication requesting apparatus 1 and authentication server 2, respectively. Hereinafter, the respective hardware configurations of the authentication requesting apparatus 1 and authentication server 2 will be described in this order.

[1-1-1. Authentication Requesting Apparatus 1]

FIG. 2 is a hardware configuration diagram of the authentication requesting apparatus 1. As illustrated in FIG. 2, the authentication requesting apparatus 1 includes a controller 11, a memory 12, a communication unit 13, an operating panel 14, a medium insertion unit 15, an imaging unit 16, an electric lock interface (electric lock I/F) 17.

The controller 11 includes a central processing unit (CPU). On the basis of a program stored in the memory 12, the controller 11 executes various arithmetic processing and also controls various units of the authentication requesting apparatus 1.

The memory 12, which stores a control program such as the operating system of the authentication requesting apparatus 1 and data, is also used as a work memory for the controller 11. The program may be supplied to the authentication requesting apparatus 1 while being stored on an information storage medium such as an optical disc, a magnetic disk, a magnetic tape, a magneto-optical disc, or a flash memory, or may be supplied to the authentication requesting apparatus 1 via a data communication network such as the Internet.

The communication unit 13 includes, for example, a network interface card (NIC). The communication unit 13 communicates with the authentication server 2 via the NIC.

The operating panel 14 includes an input device such as a touch panel or a keyboard, and a display device such as a liquid crystal display. The operating panel 14 accepts an operational input from the user, and also displays the result (screen) of information processing executed by the controller 11 on the display device.

The medium insertion unit 15 has a slot for inserting a medium used for authentication, and a holder that holds the medium inserted through the slot.

The imaging unit 16 includes a camera that captures, for a medium inserted in the medium insertion unit 15, an image of a unique pattern appearing on the surface of the medium. The imaging unit 16 may capture an image of a predetermined position on the surface of the medium inserted in the medium insertion unit 15 at a resolution of, for example, about 600 dpi to obtain an image of a predetermined size (for example, 32×32 dots) as surface pattern information.

The electric lock I/F 17 is connected to the electric lock 3. The electric lock I/F 17 transmits a signal that commands the electric lock 3 to switch between locked and unlocked states, on the basis of an instruction from the controller.

[1-1-2. Authentication Server 2]

Next, a configuration of the authentication server 2 will be described. FIG. 3 is a hardware configuration diagram of the authentication server 2. As illustrated in FIG. 3, the authentication server 2 includes a controller 21, a memory 22, and a communication unit 23.

The controller 21 includes a central processing unit (CPU). The controller 21 executes various arithmetic processing on the basis of a program stored in the memory 22, and also controls various units of the authentication server 2.

The memory 22 stores a control program such as the operating system of the authentication server 2 and data. The memory 22 is also used as a work memory for the controller 21. The program may be supplied to the authentication server 2 while being stored on an information storage medium such as an optical disc, a magnetic disk, a magnetic tape, a magneto-optical disc, or a flash memory, or may be supplied to the authentication server 2 via data communication such as the Internet. Hereinafter, an example of data stored in the memory 22 will be described.

Figure 4A:
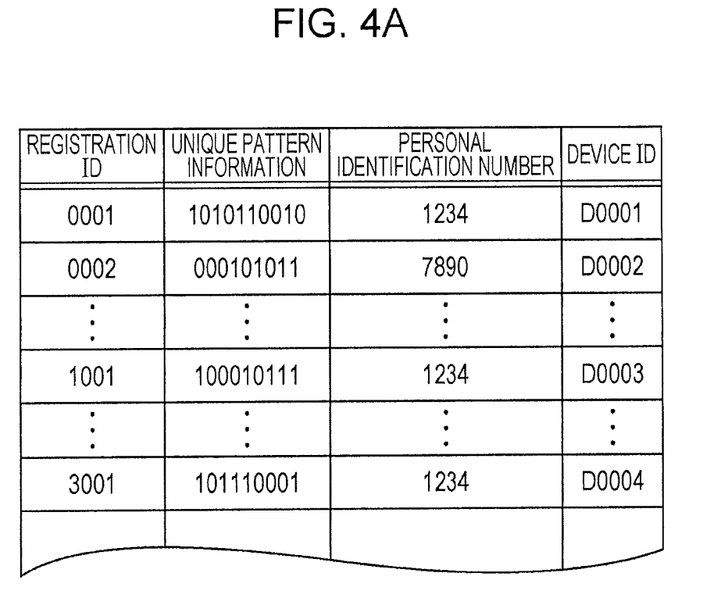
FIG. 4A illustrates an example of an authentication information management table.

FIG. 4A illustrates an example of an authentication information management table stored in the memory 22. As illustrated in FIG. 4A, the authentication information management table includes one or more records in which the following pieces of information are associated with each other: a registration ID for identifying a record in the table, surface pattern information (unique pattern information) of a medium, a personal identification number, and a device ID corresponding to the electric lock 3.

Figure 4B:
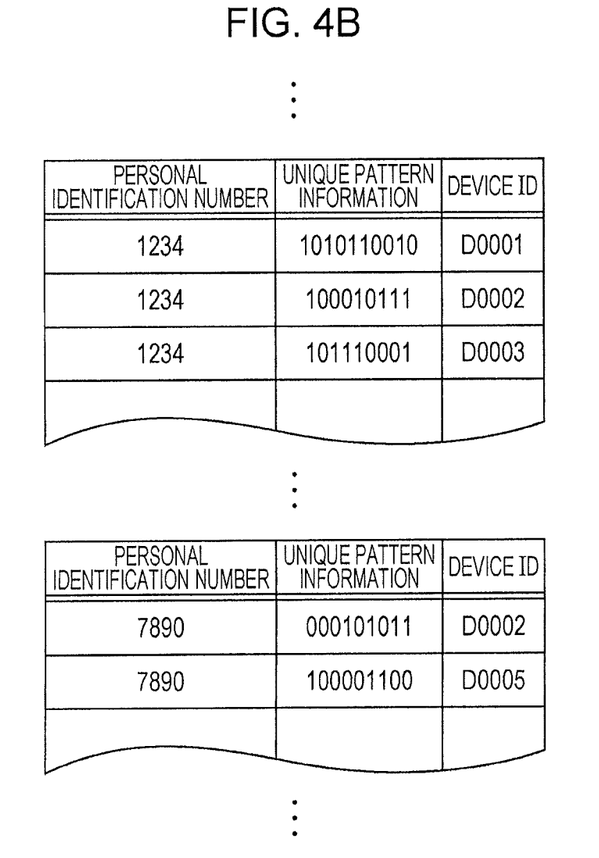
FIG. 4B illustrates an example of the authentication information management table.

Further, as illustrated in FIG. 4B, the authentication information management table stored in the memory 22 may be separated for each personal identification number. In comparison to when the table is not separated for each personal identification number, separating the table for each personal identification number in this way improves the processing speed with which a group of unique pattern information for the same personal identification number is acquired. In the first embodiment, the information stored in the authentication information management table mentioned above is registered on the basis of data transmitted from the authentication requesting apparatus 1. Details of this registration process will be described later.

The communication unit 23 includes, for example, a network interface card (NIC). The communication unit 23 connects to a network via the NIC to communicate with the authentication requesting apparatus 1.

[1-2. Description of Sequence]

Figure 6:
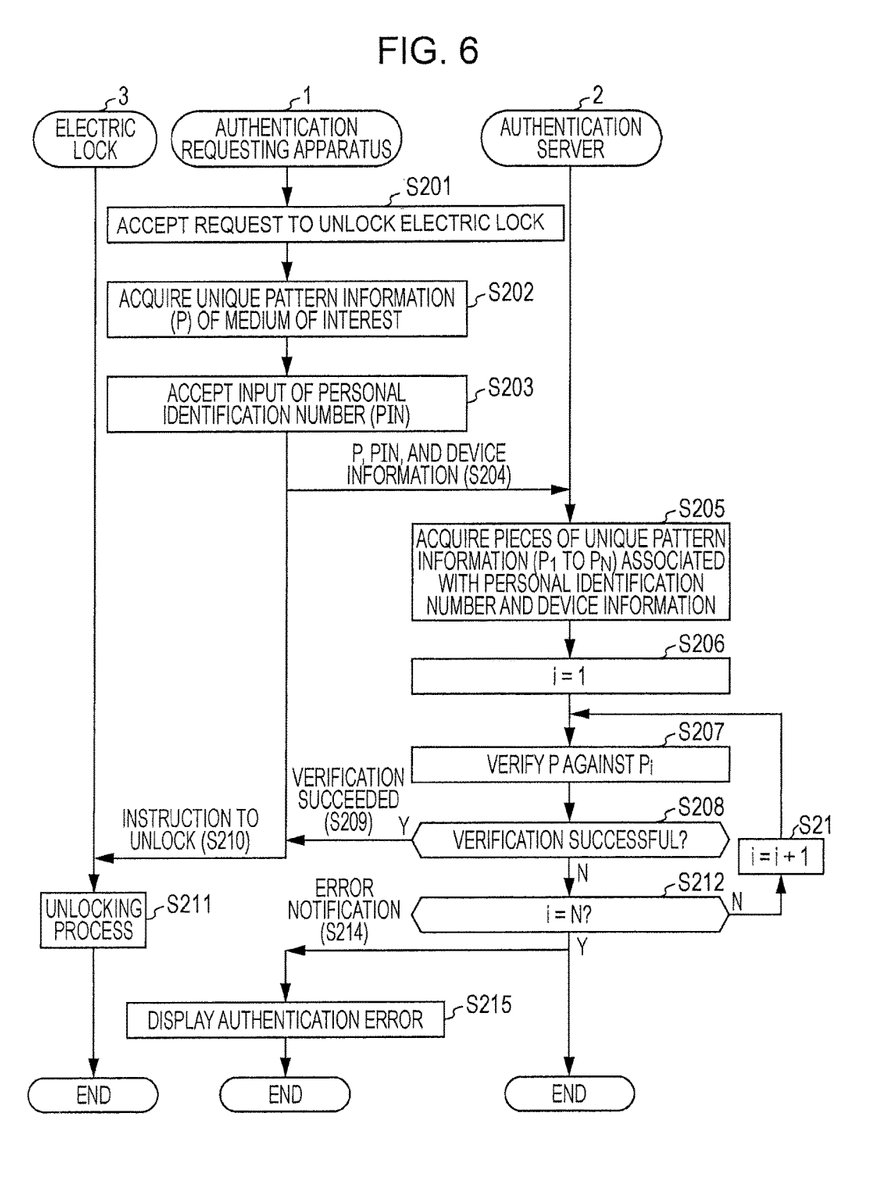
FIG. 6 is a sequence diagram of a process of determining whether to unlock an electric lock.
Figure 7:
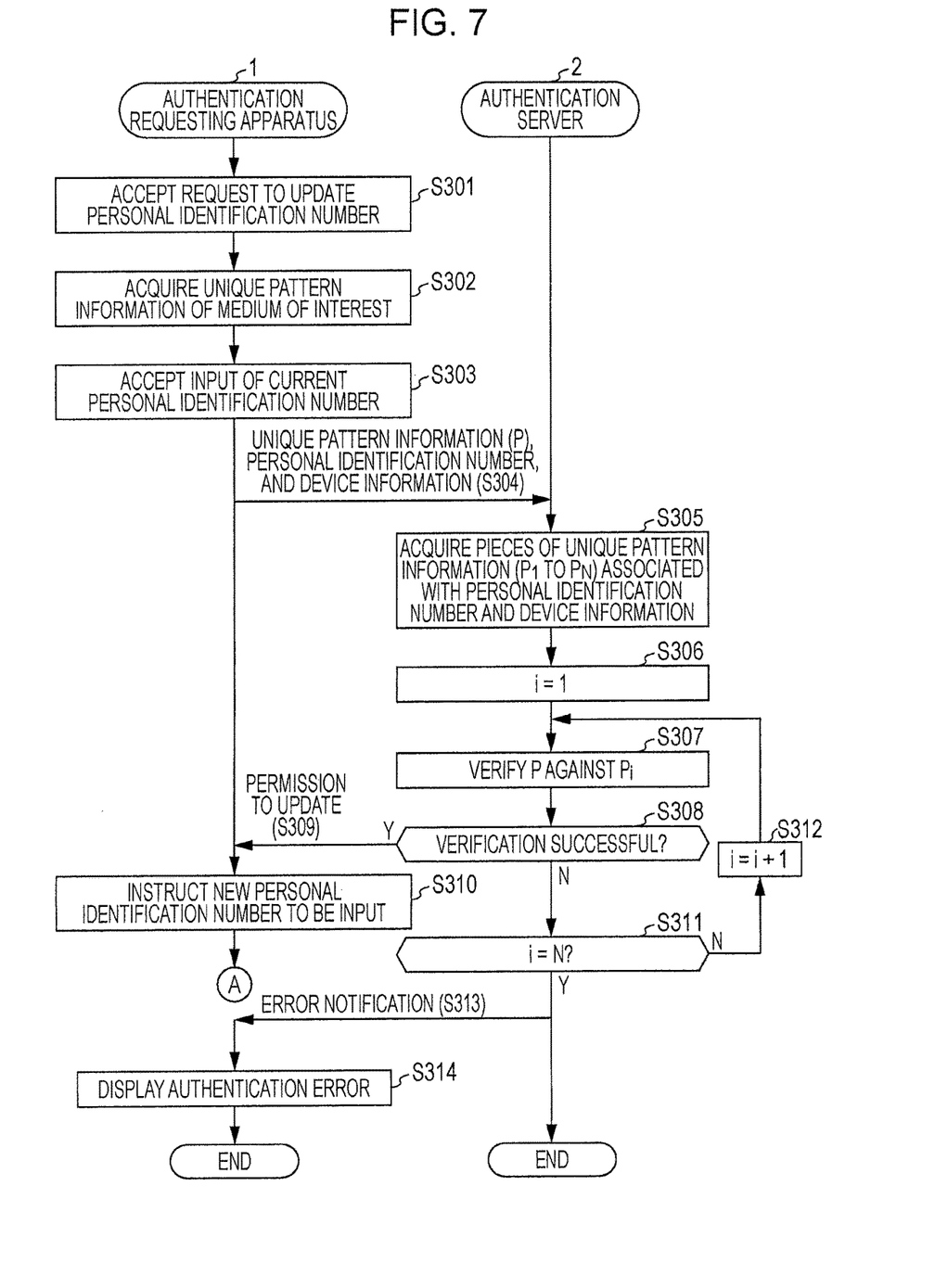
FIG. 7 is a sequence diagram of a personal identification number updating process.

Next, details of processing executed in the authentication system S will be described with reference to the sequence diagrams illustrated in FIGS. 5 to 7.

[1-2-1. Registration Process]

Figure 5:
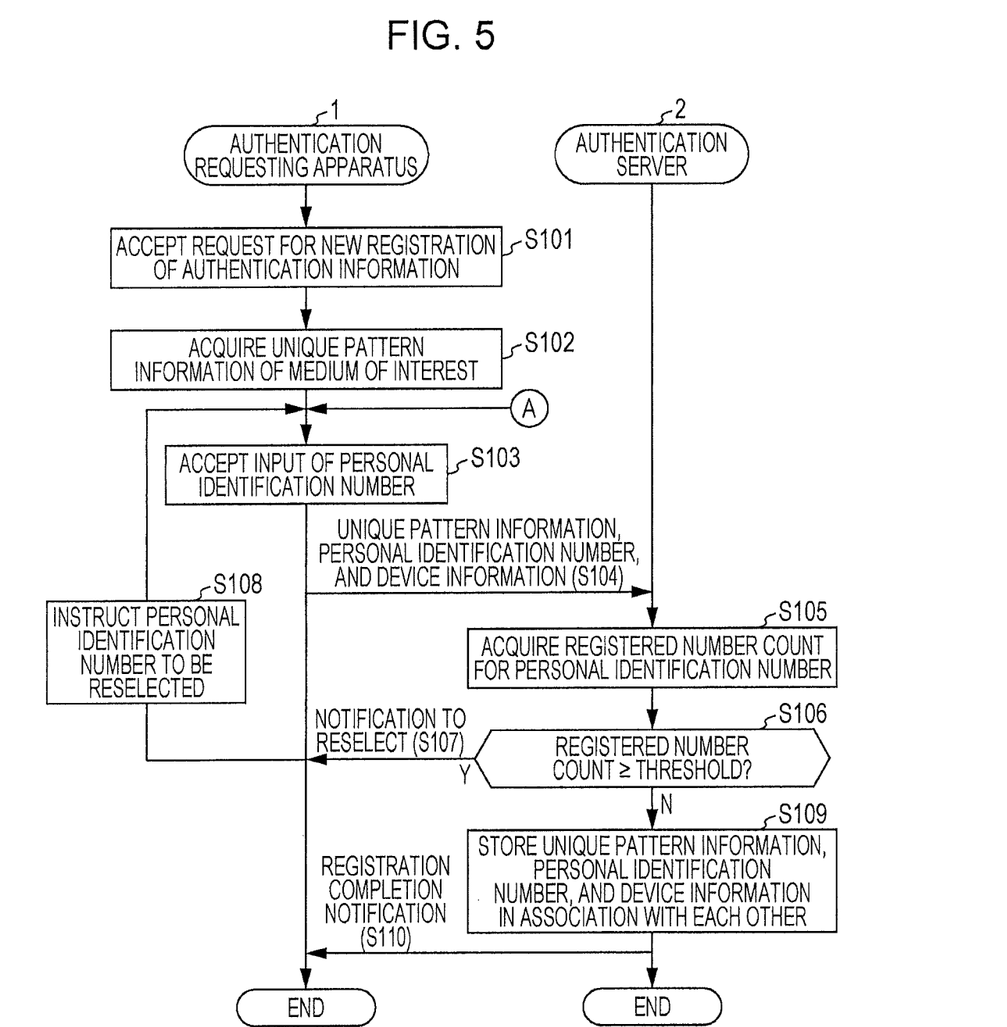
FIG. 5 is a sequence diagram of an authentication information registration process.

FIG. 5 is a sequence diagram of an authentication information registration process executed in the authentication system S. Authentication information in this case refers to information including surface pattern information unique to a medium used as a key for a specific door D, and a personal identification number.

First, the user inserts a medium (medium of interest) used as a key for a specific door D, into the medium insertion unit 15 of the authentication requesting apparatus 1 that controls the electric lock 3 of the door D. Then, the user operates the operating panel 14 of the authentication requesting apparatus 1 to indicate a request for new registration of authentication information.

When the authentication requesting apparatus 1 accepts the indication of a request for new registration of authentication information from the user (S101), the authentication requesting apparatus 1 captures an image of the surface pattern of the medium of interest inserted in the medium insertion unit 15 with the imaging unit 16, thereby acquiring unique pattern information of the surface of the medium of interest (S102).

Next, the authentication requesting apparatus 1 prompts the user to input a personal identification number by means of an operation screen displayed on the operating panel 14, and accepts an input of a personal identification number from the user via the operating panel 14 (S103). At this time, as the personal identification number, any arbitrary number may be selected by the user, or the number of the digits may be specified or some of the numerals may be specified by the authentication requesting apparatus 1.

The authentication requesting apparatus 1 transmits the unique pattern information acquired in S102, the personal identification number accepted in S103, and device information corresponding to the electric lock 3 to the authentication server 2 (S104). At this time, the device information may be either an electric lock ID for identifying the electric lock 3 or a door ID for identifying the door D. Alternatively, if the electric lock 3 and the authentication requesting apparatus 1 have a one-to-one correspondence, the device information may be an authentication requesting apparatus ID for identifying the authentication requesting apparatus 1.

The authentication server 2 acquires the number of records (registered number count) in the authentication information management table which include the personal identification number received from the authentication requesting apparatus 1 (S105). If the registered number count for the personal identification number is greater than or equal to a threshold (S106: Y), the authentication server 2 notifies the authentication requesting apparatus 1 to reselect a personal identification number (S107). In response to the notification for reselection, the authentication requesting apparatus 1 instructs the user to reselect a personal identification number (S108). Then, when a personal identification number is input from the user again, the authentication requesting apparatus 1 executes the processing from S103 onward again. By causing the user to reselect a personal identification number if the registered number count for a personal identification number is greater than or equal to a threshold in this way, the maximum number of verifications per personal identification number may be limited to less than or equal to the threshold during verification. At this time, when instructing a personal identification number to be reselected, the authentication server 2 may select at least one personal identification number in the authentication information management table for which the registered number count is less than a threshold, and notifies the authentication requesting apparatus 1 of the selected personal identification number as a recommended number.

If the registered number count for the personal identification number is not greater than or equal to a threshold in S106 (S106: N), the authentication server 2 stores the unique pattern, the personal identification number, and the device information received from the authentication requesting apparatus 1, in association with each other (S109). Specifically, the authentication server 2 generates a registration ID for identifying a record to be added to the authentication information management table, and newly registers the registration ID, the unique pattern, the personal identification number, and the device information (electric lock ID) in the authentication information management table.

Once the unique pattern, the personal identification number, and the device information are registered, the authentication server 2 notifies the authentication requesting apparatus 1 of the completion of registration (S110), and ends the registration process.

[1-2-2. Process of Determining Whether to Unlock Electric Lock 3 (Key Authentication Process)]

Next, a process of determining whether to unlock the electric lock 3 which is executed in the authentication system S will be described with reference to the sequence diagram illustrated in FIG. 6.

First, the user inserts a medium (medium of interest) used as a key for a specific door D, into the medium insertion unit 15 of the authentication requesting apparatus 1 that controls the electric lock 3 of the door D. Then, the user operates the operating panel 14 of the authentication requesting apparatus 1 to indicate a request to unlock the electric lock 3.

When the authentication requesting apparatus 1 accepts the indication of a request to unlock the electric lock 3 from the user (S201), the authentication requesting apparatus 1 captures an image of the surface pattern of the medium of interest inserted in the medium insertion unit 15 with the imaging unit 16, thereby acquiring unique pattern information of the surface of the medium of interest (S202).

Next, the authentication requesting apparatus 1 prompts the user to input a personal identification number by means of an operation screen displayed on the operating panel 14, and accepts an input of a personal identification number from the user via the operating panel 14 (S203).

The authentication requesting apparatus 1 transmits the unique pattern information (P) acquired in S202, the personal identification number (PIN) accepted in S203, and device information corresponding to the electric lock 3 to the authentication server 2 (S204).

The authentication server 2 acquires pieces of unique pattern information (P1 to PN) stored in association with the personal identification number and the device information received from the authentication requesting apparatus 1 in S204, from the authentication information management table stored in the memory 22 (S205). At this time, N denotes the number of different pieces of unique pattern information associated with the personal identification number received in S204, and P1 to PN denote individual pieces of unique pattern information.

The authentication server 2 initializes a variable i to 1 (S206), and verifies the unique pattern information (P) received in S204, against Pi among the pieces of unique pattern information acquired in S205 (S207). For example, in a case where unique pattern information is a vector representing an image feature, if the similarity between a vector P and a vector Pi is greater than or equal to a threshold, P and Pi may be determined to match (successful verification). Otherwise, P and Pi may be determined to not match (failed verification). The similarity between the vector P and the vector Pi may be determined on the basis of the inner product of the vectors or the distance between the vectors. Specifically, the vector P and the vector Pi may be determined to be similar if the inner product of the vector P and the vector Pi is greater than or equal to a threshold. Further, the vector P and the vector Pi may be determined to be similar if the distance between the vector P and the vector Pi is less than or equal to a threshold.

If the verification in S207 results in a successful verification of P and Pi (S208: Y), the authentication server 2 notifies the authentication requesting apparatus 1 that the verification has succeeded (S209).

When the authentication requesting apparatus 1 receives the notification of successful verification from the authentication server 2, the authentication requesting apparatus 1 transmits, to the electric lock 3 to be unlocked, a signal instructing that the electric lock 3 be unlocked (S210), causes the electric lock 3 to execute an unlocking process (S211), and ends the processing.

If, in S208, the verification in S207 does not result in a successful verification of P and Pi (S208: N), the authentication server 2 determines whether the variable i has reached N (S212). Then, if the variable i has not reached N (S212: N), the authentication server 2 increments (adds 1 to) the variable i (S213), and returns to S207. If the variable i has reached N in S212 (S212: Y), the authentication server 2 provides notification of an error (authentication error) indicating that authentication has failed (S214).

When the authentication requesting apparatus 1 receives the notification of an authentication error from the authentication server 2, the authentication requesting apparatus 1 displays a screen indicating that an authentication error has occurred on the operating panel 14 (S215), and ends the processing.

[1-2-3. Authentication Information Updating Process]

Next, an authentication information updating process (personal identification number updating process) executed in the authentication system S will be described with reference to the sequence diagram illustrated in FIG. 7.

First, the user inserts a medium (medium of interest) used as a key for a specific door D, into the medium insertion unit 15 of the authentication requesting apparatus 1 that controls the electric lock 3 of the door D. Then, the user operates the operating panel 14 of the authentication requesting apparatus 1 to indicate a request to update a personal identification number.

When the authentication requesting apparatus 1 accepts the indication of a request to update a personal identification number from the user (S301), the authentication requesting apparatus 1 captures an image of the surface pattern of the medium of interest inserted in the medium insertion unit 15 with the imaging unit 16, thereby acquiring unique pattern information of the surface of the medium of interest (S302).

Next, the authentication requesting apparatus 1 prompts the user to input the current personal identification number by means of an operation screen displayed on the operating panel 14, and accepts an input of the current personal identification number from the user via the operating panel 14 (S303).

The authentication requesting apparatus 1 transmits the unique pattern information (P) acquired in S302, the personal identification number (PIN) accepted in S303, and device information corresponding to the electric lock 3 to the authentication server 2 (S304).

The authentication server 2 acquires pieces of unique pattern information ($P_1$ to $P_N$) stored in association with the personal identification number and the device information received from the authentication requesting apparatus 1 in S304, from the authentication information management table stored in the memory 22 (S305). At this time, N denotes the number of different pieces of unique pattern information associated with the personal identification number received in S304, and P1 to PN denote individual pieces of unique pattern information.

The authentication server 2 initializes a variable i to 1 (S306), and verifies the unique pattern information (P) received in S304, against Pi among the pieces of unique pattern information acquired in S305 (S307).

If the verification in S307 results in a successful verification of P and Pi (S308: Y), the authentication server 2 notifies the authentication requesting apparatus 1 that it is permitted to update the personal identification number (S309).

When the authentication requesting apparatus 1 receives the notification of permission to update from the authentication server 2, the authentication requesting apparatus 1 instructs the user to input a new personal identification number by means of an operation screen displayed on the operating panel 14 (S310). Since the processing after the authentication requesting apparatus 1 accepts an input of a new personal identification information from the user is the same as the processing from S103 onward in FIG. 5, a description of the processing is omitted.

If, in S308, the verification in S307 does not result in a successful verification of P and Pi (S308: N), the authentication server 2 determines whether the variable i has reached N (S311). Then, if the variable i has not reached N (S311: N), the authentication server 2 increments (adds 1 to) the variable i (S312), and returns to S307. If the variable i has reached N in S311 (S311: Y), the authentication server 2 provides notification of an error (authentication error) indicating that authentication has failed (S313).

When the authentication requesting apparatus 1 receives the notification of an authentication error from the authentication server 2, the authentication requesting apparatus 1 displays a screen indicating that an authentication error has occurred on the operating panel 14 (S314), and ends the processing.

According to the sequence mentioned above, it is possible for the user to update a personal identification number in a secure manner. While the sequence mentioned above is directed to updating of a personal identification number, deletion of authentication information may be executed in a similar fashion.

In the authentication system S according to the first embodiment mentioned above, the electric lock 3 may be unlocked only by use of a correct pair of a medium used as a key for the electric lock 3 provided to the door D, and a personal identification number. Further, any medium may be used as a key as long as the medium has a unique pattern appearing on its surface. Further, since the number of overlapping personal identification numbers is set to less than or equal to a threshold, the processing load and the verification wait time during verification may be reduced.

2. Second Embodiment

Next, an authentication system S according to a second embodiment of the present invention will be described with reference to FIGS. 8 to 10.

The authentication system S according to the second embodiment performs, for example, authentication of a card such as a bank's cash card on the basis of unique pattern information on the surface of the card.

Figure 8:
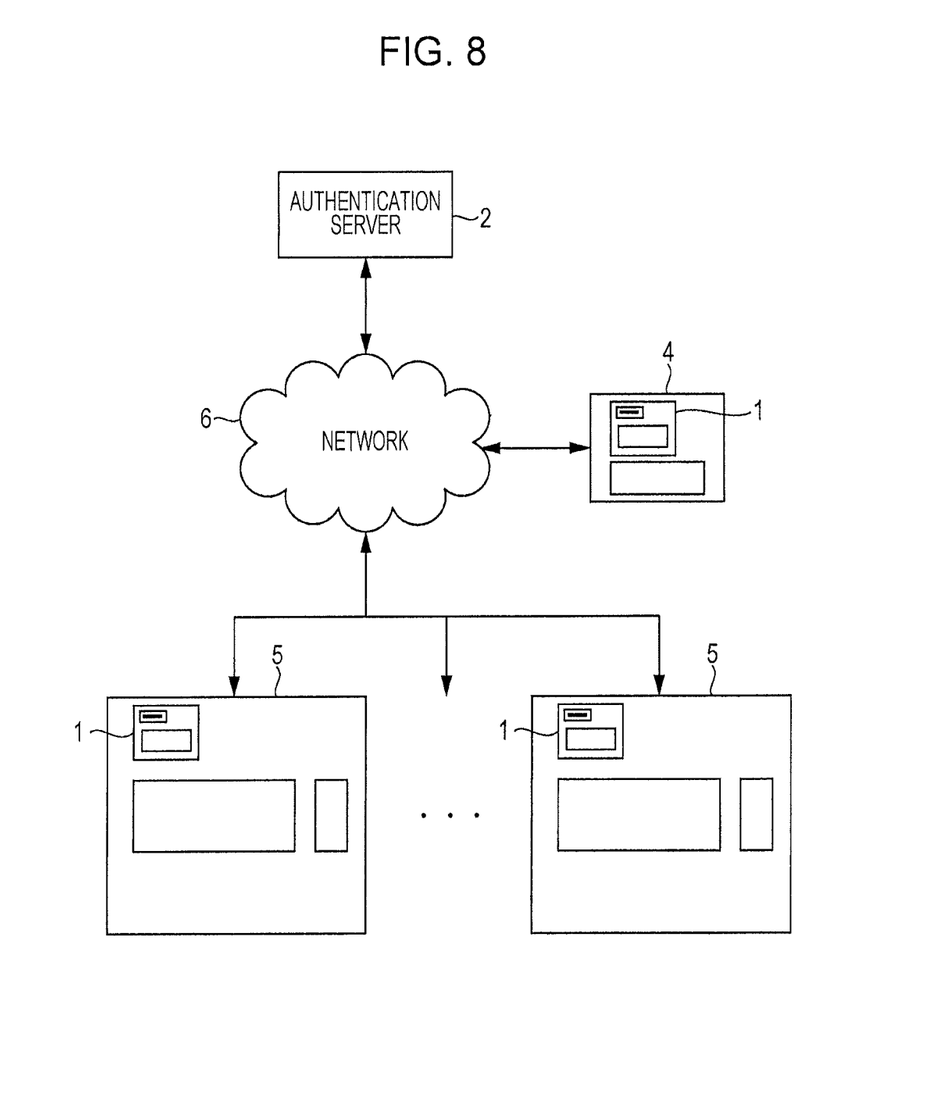
FIG. 8 is a system configuration diagram of an authentication system according to a second embodiment.

FIG. 8 is a system configuration diagram of the authentication system S according to the second embodiment. As illustrated in FIG. 8, the authentication system S according to the second embodiment includes a registration apparatus 4 that registers authentication information unique to a card, and a card authentication requesting apparatus 5 (which may be, for example, a bank's ATM) that performs card authentication. The registration apparatus 4 and the card authentication requesting apparatus 5, and the authentication server 2 communicate data with each other via the network 6. In this case, the registration apparatus 4 and the card authentication requesting apparatus 5 may each include the authentication requesting apparatus 1 described above with reference to the first embodiment. Since the functions provided in the authentication requesting apparatus 1 and the authentication server 2 are the same as those described above with reference to the first embodiment, a description of these functions is omitted herein.

[2-1. Description of Sequence]

Next, details of processing executed in the authentication system S will be described with reference to the sequence diagrams illustrated in FIGS. 9 and 10.

[2-1-1. Registration Process]

Figure 9:
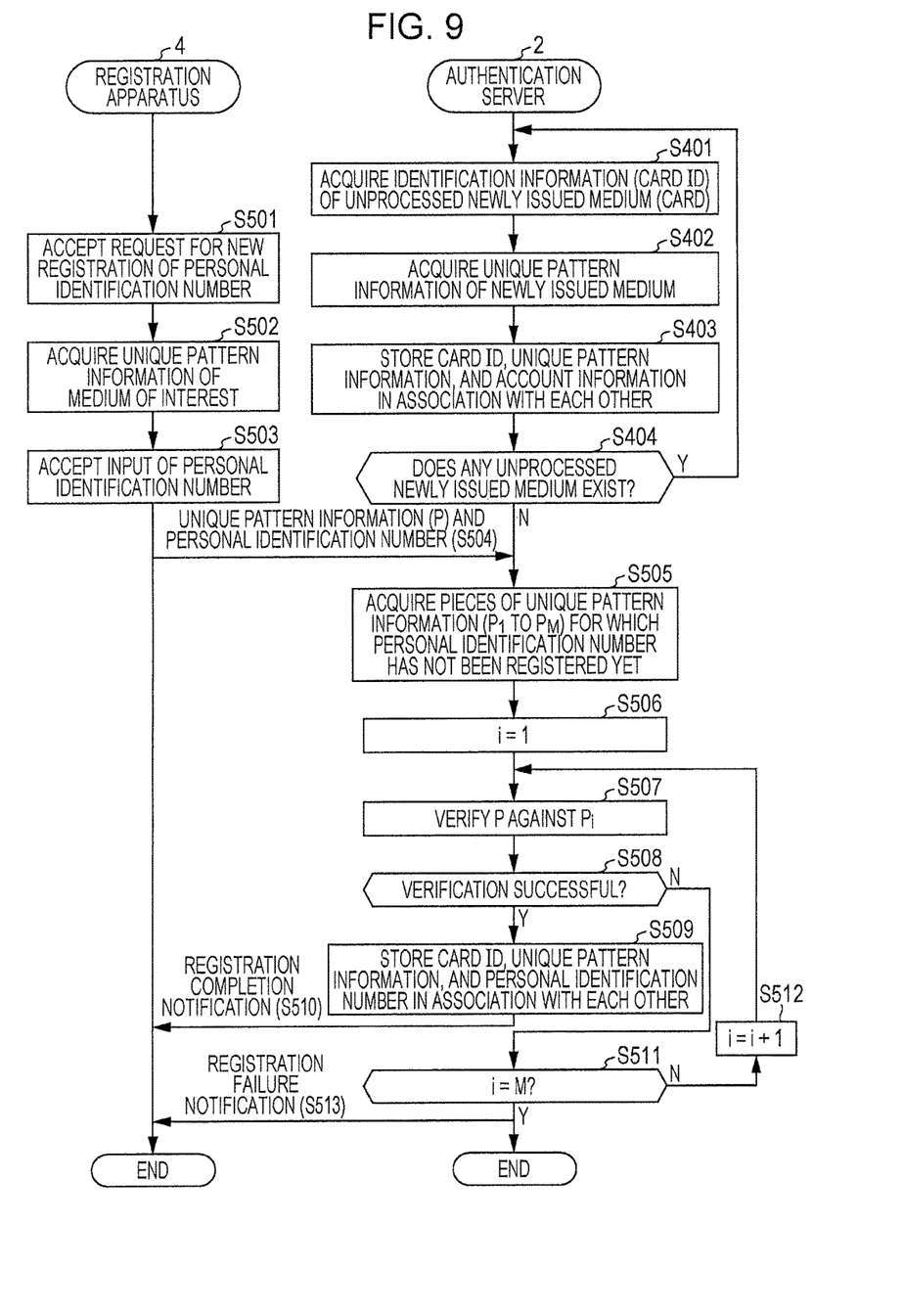
FIG. 9 is a sequence diagram of an authentication information registration process.
Figure 10:
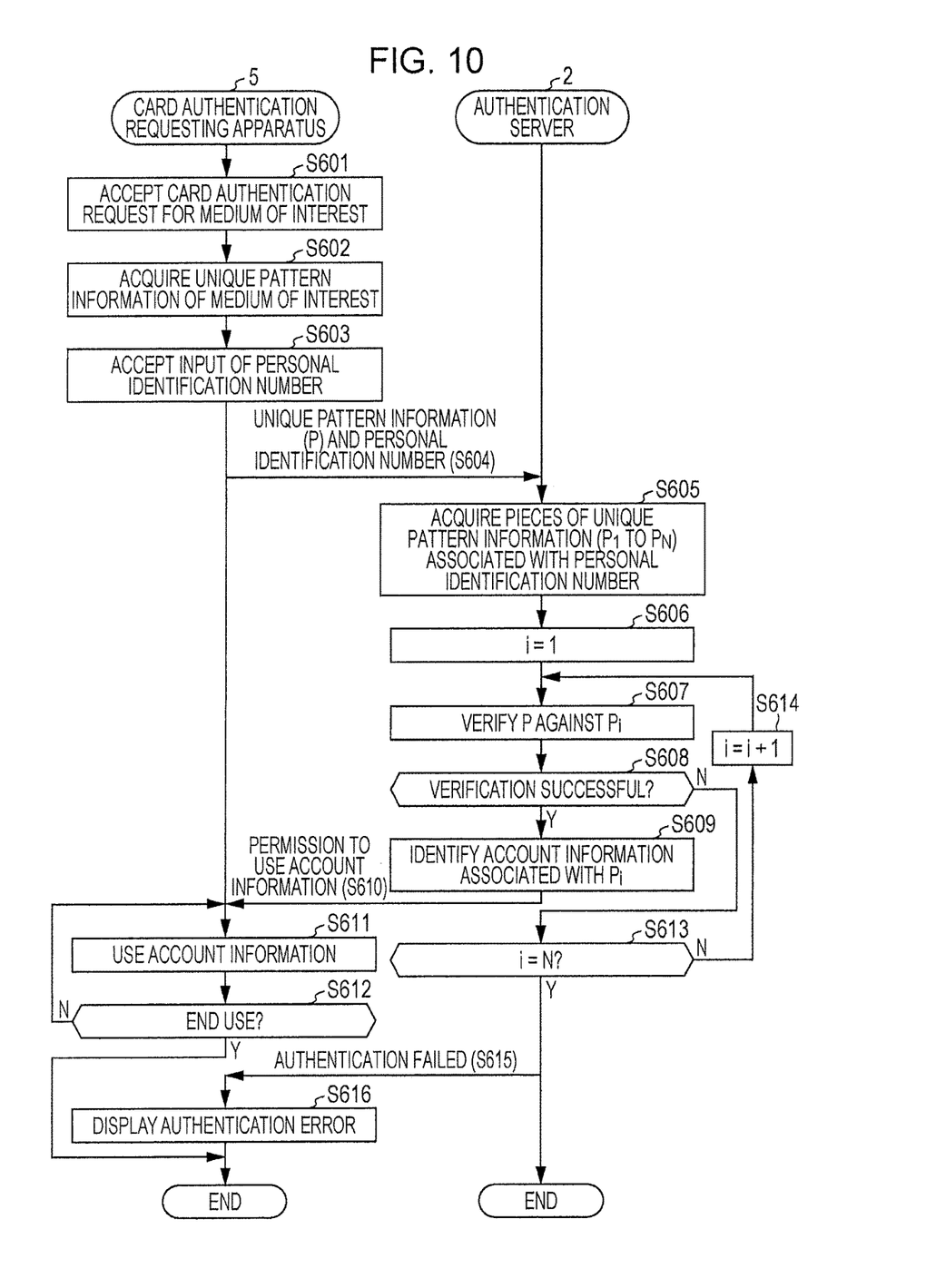
FIG. 10 is a sequence diagram of a card authentication process.

FIG. 9 is a sequence diagram of an authentication information registration process executed in the authentication system S. Authentication information in this case refers to information including surface pattern information unique to a card (medium), and a personal identification number.

Figure 11:
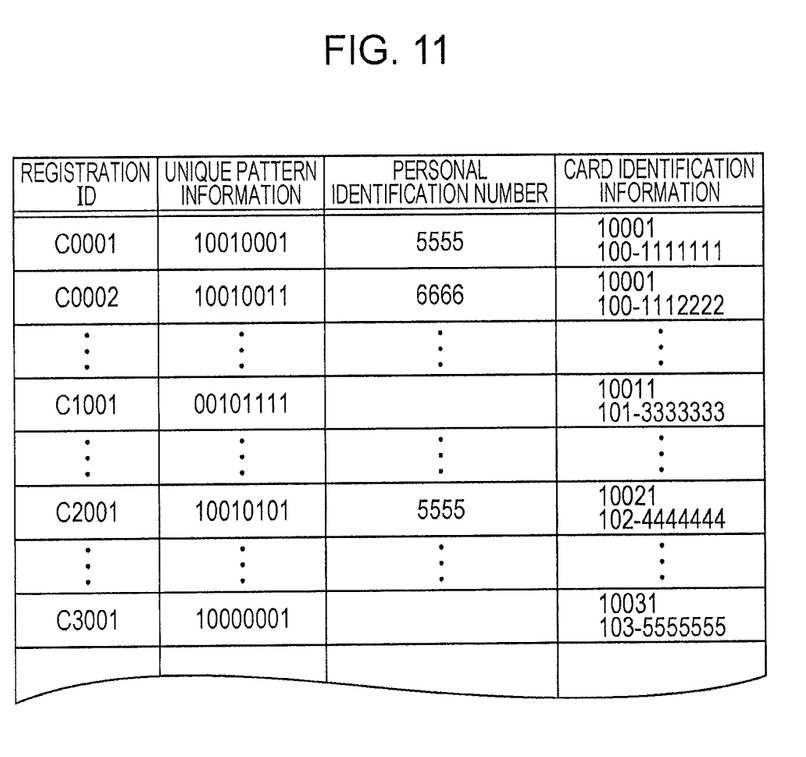
FIG. 11 illustrates an example of a card authentication information management table.

As illustrated in FIG. 9, first, the authentication server 2 performs the following pre-registration process before a medium (card) is delivered to a user after being issued. That is, the authentication server 2 acquires identification information (such as a card ID and an account number) of a newly issued medium (card) that has not been processed yet (S401), and acquires unique pattern information of the surface of the newly issued medium (card) (S402). Then, the authentication server 2 stores the identification information of the card, and the unique pattern information of the card into a card authentication information management table illustrated in FIG. 11 in association with each other (S403). As illustrated in FIG. 11, the card authentication information management table stores the following pieces of information in association with each other: registration ID, unique pattern information, personal identification number, and card identification information (account number). Then, if there is any newly issued medium that has not been processed yet (S404: Y), the authentication server 2 returns to S401, and repeats execution of the processing.

When the user receives the medium (card) of interest that has been issued, the user inserts the medium of interest into the medium insertion unit 15 of the authentication requesting apparatus 1 provided in the registration apparatus 4. Then, the user operates the operating panel 14 of the authentication requesting apparatus 1 to indicate a request for new registration of authentication information.

That is, when the registration apparatus 4 accepts the indication of a request for new registration of authentication information from the user (S501), the registration apparatus 4 captures an image of the surface pattern of the medium of interest inserted in the medium insertion unit 15 with the imaging unit 16, thereby acquiring unique pattern information of the surface of the medium of interest (S502).

Next, the registration apparatus 4 prompts the user to input a personal identification number by means of an operation screen displayed on the operating panel 14, and accepts an input of a personal identification number from the user via the operating panel 14 (S503). At this time, as the personal identification number, any arbitrary number may be selected by the user, or the number of digits may be specified or some of the numerals may be specified by the registration apparatus 4.

The registration apparatus 4 transmits the unique pattern information (P) acquired in S502, and the personal identification number (PIN) accepted in S503 to the authentication server 2 (S504).

The authentication server 2 acquires pieces of unique pattern information (P1 to PM) for which a personal identification number has been registered yet in the card authentication information management table (S505). At this time, M denotes the number of pieces of unique pattern information for which a personal identification number has not been registered yet, and P1 to PM denote individual pieces of unique pattern information.

The authentication server 2 initializes a variable i to 1 (S506), and verifies the unique pattern information (P) received in S504, against Pi among the pieces of unique pattern information acquired in S505 (S507).

If the verification in S507 results in a successful verification of P and Pi (S508: Y), the authentication server 2 stores a card ID (such as an account number), the unique pattern information (Pi), and the personal identification number received in S504 into the card authentication information management table in association with each other (S509), notifies the registration apparatus 4 of the completion of registration (S510), and ends the processing.

If, in S508, the verification in S507 does not result in a successful verification of P and Pi (S508: N), the authentication server 2 determines whether the variable i has reached M (S511). Then, if the variable i has not reached M (S511: N), the authentication server 2 increments (adds 1 to) the variable i (S512), and returns to S507. If the variable i has reached M in S511 (S511: Y), the authentication server 2 notifies the registration apparatus 4 of an error (registration error) indicating that registration has failed (S513), and ends the processing.

[2-1-2. Card Authentication Process]

Next, a card authentication process executed by the authentication system S will be described with reference to the sequence diagram illustrated in FIG. 10.

First, the user inserts a medium (medium of interest) that is to be authenticated to the card authentication requesting apparatus 5, into the medium insertion unit 15 of the authentication requesting apparatus 1 provided in the card authentication requesting apparatus 5. Then, the user operates the operating panel 14 of the authentication requesting apparatus 1 to request authentication of the medium of interest.

When the card authentication requesting apparatus 5 accepts the request to authenticate the medium of interest from the user (S601), the card authentication requesting apparatus 5 captures an image of the surface pattern of the medium of interest inserted in the medium insertion unit 15 with the imaging unit 16, thereby acquiring unique pattern information of the surface of the medium of interest (S602).

Next, the card authentication requesting apparatus 5 prompts the user to input a personal identification number by means of an operation screen displayed on the operating panel 14, and accepts an input of a personal identification number from the user via the operating panel 14 (S603).

The card authentication requesting apparatus 5 transmits the unique pattern information (P) acquired in S602, and the personal identification number (PIN) accepted in S603 to the authentication server 2 (S604).

The authentication server 2 acquires pieces of unique pattern information (P1 to PN) stored in association with the personal identification number received from the card authentication requesting apparatus 5 in S604, from the authentication information management table stored in the memory 22 (S605). At this time, N denotes the number of different pieces of unique pattern information associated with the personal identification number received in S604, and P1 to PN denote individual pieces of unique pattern information.

The authentication server 2 initializes a variable i to 1 (S606), and verifies the unique pattern information (P) received in S604, against Pi among the pieces of unique pattern information acquired in S605 (S607).

If the verification in S607 results in a successful verification of P and Pi (S608: Y), the authentication server 2 identifies information (for example, account information) of a card associated with Pi (S609), and notifies the card authentication requesting apparatus 5 that it is permitted to use account information (S610).

When the card authentication requesting apparatus 5 receives the notification of permission to use the card from the authentication server 2, the card authentication requesting apparatus 5 executes processing that uses the account information (S611), and ends the processing when ending use of the card (S612: Y). In S611, the authentication server 2 may execute processing that uses information associated with Pi.

If, in S608, the verification in S607 does not result in a successful verification of P and Pi (S608: N), the authentication server 2 determines whether the variable i has reached N (S613). Then, if the variable i has not reached N (S613: N), the authentication server 2 increments (adds 1 to) the variable i (S614), and returns to S607. If the variable i has reached N in S613 (S613: Y), the authentication server 2 provides notification of an error (authentication error) indicating that authentication has failed (S615).

When the card authentication requesting apparatus 5 receives the notification of an authentication error from the authentication server 2, the card authentication requesting apparatus 5 displays a screen indicating that an authentication error has occurred on the operating panel 14 (S616), and ends the processing.

With the authentication system S according to the second embodiment mentioned above, it is possible to determine whether a medium is a legitimately issued medium. Therefore, registration of a medium is rejected unless the medium is a legitimately issued medium. Further, by associating, for example, attribute information such as user information or account information with the unique pattern information of a medium in advance at the time of issuing of the medium, processing that uses the information associated with the unique pattern information of the medium may be provided for the medium that has been authenticated.

In the above embodiments, for example, an expiration date may be set for a personal identification number in the authentication information registration process. Further, the threshold to be compared with the registered number count for authentication information in S106 of the sequence diagram in FIG. 5 may be a fixed value, or may be set to a value that varies with the allowed processing wait time selected by the user. Further, in the second embodiment, a portion (for example, the first four digits) of a personal identification number may be written on the card surface, and the remainder (for example, the last four digits) of the personal identification number may be set by the user.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An authentication system comprising:
   a storing unit that stores, for each of one or more objects to be registered and associated with each other on a memory, (i) unique pattern information of a surface of the object to be registered, the object being a medium that has the unique pattern information on a surface of the object, and (ii) a personal identification number;
   an acquiring unit that acquires first unique pattern information of the surface of the object to be authenticated, which is related to an authentication request, and a personal identification number;
   a controller configured to:
      extract, from the memory, second unique pattern information stored in association with the personal identification number acquired by the acquiring unit;
      determine whether the extracted second unique pattern information includes unique pattern information corresponding to the acquired first unique pattern information; and
      upon instructing that a personal identification number related to a registration request be reselected, provide a notification of a personal identification number for which a number of pieces of unique pattern information stored in association with the personal identification number is less than a threshold, among personal identification numbers that are stored in the memory.

2. The authentication system according to claim 1, wherein the controller is further configured to unlock an electric lock based on whether the extracted second unique pattern information includes unique pattern information corresponding to the acquired first unique pattern information.

3. A system comprising:
   a controller configured to:
      accept a storing request to store a new record to associate a unique pattern information with a number string;
      check a number of existing records on a memory associated with the number string;
      accept an authentication request to authenticate an object, the authentication request including unique pattern information of the object and the number string;
      authenticate the object if the unique pattern information in the authentication request and the number string in the authentication request are associated in the memory;
      unlock an electric lock based on whether the object is authenticated;
      upon the number of existing records in the memory associated with the number string being less than a threshold, store the new record to associate the pattern information with the number string in the memory;
      upon the number of existing records in the memory associated with the number string being greater than the threshold, refrain from storing the new record to associate the unique pattern information with the number string in the memory and instruct a user to reselect a number string; and
      upon instructing that a personal identification number related to a registration request be reselected, provide a notification of a personal identification number for which a number of pieces of unique pattern information stored in association with the personal identification number is less than a threshold, among personal identification numbers that are stored in the memory.

4. The system according to claim 3, wherein the pattern information is an object surface pattern information.

5. A system comprising:
   a controller configured to:
      accept a number string;
      accept a unique piece of pattern information;
      authenticate the unique piece of pattern information if the unique piece of pattern information is found in the table and the number string is associated with the unique piece of pattern information in the table, and that does not authenticate the unique piece of pattern information if the unique piece of pattern information is found in the table and the number string is associated with the unique piece of pattern information in the table;
      unlock an electric lock based on whether the controller has authenticated or not authenticated the unique piece of pattern information;
      upon a number of unique pieces of pattern information associated with the number string being less than a threshold, create a record in a table, in a memory, to associate the unique piece of pattern information with the number string;
      upon the number of unique pieces of pattern information associated with the number string being greater than the threshold, refrain from creating a new record in the table to associate the unique piece of pattern information with the number string and instruct to a user to reselect a number string; and
      upon instructing that a personal identification number related to a registration request be reselected, provide a notification of a personal identification number for which a number of pieces of unique pattern information stored in association with the personal identification number is less than a threshold, among personal identification numbers that are stored in the memory.

6. The system according to claim 5, wherein the pattern information is an object surface pattern information.

* * * * *